United States Patent
Verbeek et al.

(10) Patent No.: US 9,574,934 B2
(45) Date of Patent: Feb. 21, 2017

(54) ILLUMINATION SENSOR FOR DISTINGUISHING BETWEEN DIFFERENT CONTRIBUTIONS TO A SENSED LIGHT LEVEL

(71) Applicant: PHILIPS LIGHTING HOLDING B.V., Eindhoven (NL)

(72) Inventors: Petrus Antonius Verbeek, Deurne (NL); Michel Albertus Theodorus Klein Swormink, Eindhoven (NL); Roger Peter Anna Delnoij, Lommel (BE); Johannes Martinus Maria Hensing, Veldhoven (NL); Jurgen Mario Vangeel, Beerse (BE); Johannes Jozef Wilhelmus Kalfs, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 64 days.

(21) Appl. No.: 14/435,309

(22) PCT Filed: Oct. 8, 2013

(86) PCT No.: PCT/IB2013/059203
§ 371 (c)(1),
(2) Date: Apr. 13, 2015

(87) PCT Pub. No.: WO2014/060901
PCT Pub. Date: Apr. 24, 2014

(65) Prior Publication Data
US 2016/0245688 A1    Aug. 25, 2016

Related U.S. Application Data

(60) Provisional application No. 61/714,479, filed on Oct. 16, 2012.

(51) Int. Cl.
H05B 37/02 (2006.01)
G01J 1/42 (2006.01)
(Continued)

(52) U.S. Cl.
CPC ............ G01J 1/4204 (2013.01); G01J 1/0266 (2013.01); G01J 1/06 (2013.01); G01J 1/4228 (2013.01); H05B 37/0218 (2013.01); Y02B 20/46 (2013.01)

(58) Field of Classification Search
CPC ............ H05B 37/0218; H05B 37/0227; H05B 37/0245
(Continued)

(56) References Cited

U.S. PATENT DOCUMENTS 3,703,338 A    11/1972  Breneman
6,337,541 B1 *  1/2002  Dickie .................. H05B 33/08
                                                  315/169.3
(Continued)

FOREIGN PATENT DOCUMENTS

DE    3526590 A1    1/1986
WO    2009034515 A2    3/2009
WO    2012048436 A1    4/2012

Primary Examiner — Kevin Pyo (57) ABSTRACT

An apparatus comprises a first light sensor configured with a first field of view; and a second light sensor configured with a second, narrower field of view contained within the first field of view. The first and second light sensors may be arranged to detect light reflected from an illuminated surface, wherein the first and second field of view encompass light from an electric lighting device reflected from said surface and additional light reflected from said surface, e.g. natural light; but the second light sensor is concentrated on a region on said surface so as to exclude glare from objects outside said region, whereas the first field of view extends beyond said region. An illumination level of the environment in which the apparatus is installed may be adjusted to
(Continued)

compensate for a change in the additional light based on information distinguishing between the two sensors.

12 Claims, 5 Drawing Sheets

(51) Int. Cl.
    *G01J 1/06*     (2006.01)
    *G01J 1/02*     (2006.01)

(58) Field of Classification Search
    USPC ... 250/205, 214 R, 214 AL, 214 B; 315/152, 315/158, 308, 312
    See application file for complete search history.

(56) References Cited

U.S. PATENT DOCUMENTS

| | | | |
|---|---|---|---|
| 7,190,126 B1 * | 3/2007 | Paton | H05B 37/0272 315/308 |
| 8,207,676 B2 | 6/2012 | Hilgers | |
| 2011/0115386 A1 | 5/2011 | Delnoij | |

\* cited by examiner

ILLUMINATION SENSOR FOR DISTINGUISHING BETWEEN DIFFERENT CONTRIBUTIONS TO A SENSED LIGHT LEVEL

CROSS-REFERENCE TO PRIOR APPLICATIONS

This application is the U.S. National Phase application under 35 U.S.C. §371 of International Application No. PCT/IB2013/059203, filed on Oct. 8, 2013, which claims the benefit of U.S. Provisional Patent Application No. 61/714, 479, filed on Oct. 16, 2012, filed Oct. 16, 2012. These applications are hereby incorporated by reference herein.

FIELD OF THE INVENTION

The present invention relates to sensing light in an environment illuminated by light from different sources, for example light from an electric lighting device and additional light from at least one other source such as daylight entering a room through a window. For instance this may be used as part of a lighting control system to regulate the level of light in the room or other space.

BACKGROUND OF THE INVENTION

Daylight harvesting refers to the use of natural daylight to supplement the artificial light in an environment such as an interior space of a building, e.g. an office or other room. The idea can be used to reduce the amount of artificial light needed to illuminate the space and so reduce energy consumption. Nonetheless, in certain environments such as an office workspace a certain standardised or recommend light level may be required, e.g. 500 Lux at desk height. Even in non-regulated environments the end-user may require a certain light level as matter of preference. Hence to conserve energy consumption whilst still meeting the relevant light level requirement, a modern lighting system may comprise a controller which adjusts the artificial light output by one or more electric lighting devices depending on the amount of daylight present.

A closed-loop control system uses feedback of the quantity it is controlling (as opposed to an open-loop system which does not use feedback). In the case of a lighting control system, a photosensor detects the total photometric amount of light from both daylight and electric sources in the space. The sensed level is then used to control the amount of light. Some systems may use "active daylighting" whereby a suitable device is controlled to admit or direct varying amounts of daylight into the space in question, e.g. by means of automatic window blinds, windows comprising "smart glass" with controllable opacity, or a heliostat comprising a movable reflector arranged to direct a controllable amount of light through a window or other opening. In addition artificial light from one or more electric lights may be adjusted to make up any requirement for overall light level that cannot be met using the natural daylight alone. Other systems may passively collect natural light though regular windows or skylights and adjust the electric light sources to meet the required light level.

U.S. Pat. No. 8,207,676 discloses an arrangement in which two different light sensors are integrated within an LED-based light source. The first sensor is provided with a diffuser arranged to collect both light from the LED light source and ambient light, whereas the second sensor is provided with sidewalls that block light from the LED source so as to only collect ambient light. These inputs are used to regulate the light output of the LED light source.

SUMMARY OF THE INVENTION

There is a problem with existing systems in that they are susceptible to measurements being disturbed by reflections of light from sources other than the lighting device in question (e.g. reflection of natural light such as daylight). Such reflections may be referred to as glare. For example, in the dual sensor arrangement mentioned above, if the reflection of ambient light is disturbed then this will be seen by both sensors and so the light regulation will also be disturbed.

In an alternative arrangement a sensor is positioned to detect the light from the lighting device based on its reflection from a surface being illuminated. For example the sensor may be mounted above a desk (or the like) so as to detect light from a lighting device being reflected back up from the desk. Here the sensor may again be susceptible to problems of glare, for example if a reflecting object such as a piece of white paper is moved on the desk.

The inventors have recognised that glare can be distinguished based on the field of view in which it falls, e.g. based on the angle at which it is reflected into the sensor.

According to one aspect of the present invention, there is provided an apparatus for sensing an illumination level in an environment, the apparatus comprising: an input for receiving signals from at least two light sensors; and a signal level detector configured to receive a first signal indicative of light reflected from an illuminated surface into a first of said light sensors having a first field of view, and to receive a second signal indicative of light reflected from the illuminated surface into a second of said light sensors having a second, narrower field of view concentrated on a region on said surface, the first field of view extending beyond said region; wherein the signal level detector is configured to determine information distinguishing between the first and second signals, and thereby distinguishing between a change in the illumination level and an effect of glare from objects outside said region.

According to another aspect of the present invention, there is provided an apparatus comprising: a first light sensor configured with a first field of view; and a second light sensor configured with a second, narrower field of view contained within the first field of view.

In an embodiment, the apparatus comprises: a mountable housing; a first sensor for sensing visible light, disposed in the housing; a second sensor for sensing visible light, disposed in the housing; a first light inlet aperture in the housing, arranged to define a viewing angle of the first sensor; and a second light inlet aperture in the housing, arranged to define a viewing angle of the second sensor which is narrower than the viewing angle of the first sensor, and which overlaps or is contained within it. The first light inlet aperture is arranged to define a viewing angle of no more than 5 degrees, centred on a first viewing axis. The first light inlet aperture may comprise one or more optics, such as one or more lenses. The second light inlet aperture may be arranged to define a viewing angle of no less than 50 degrees, centred on a second viewing axis. The second light inlet aperture may comprise one or more optics, such as one or more lenses. The first and second axes may be parallel to one another +/−5 degrees. The housing may be the, or part of the, housing of a lighting fixture whereby the first and second sensors are integrated in the lighting fixture.

According to another aspect of the present invention, there may be provided a lighting system in which the first and second light sensors are installed to detect light reflected from an illuminated surface, wherein the second light sensor is concentrated on a region on said surface so as to exclude glare from objects outside said region, whereas the first field of view extends beyond said region.

Thus the first sensor has a broader field of view whereas the second sensor is configured with a more selective view, enabling it to capture light only (or at least predominantly) from a region of interest. That is, the second field of view can be trained discriminately on the light from this region. This advantageously allows an effect representative of the actual light level of interest to be distinguished from glare such as reflection of natural light (e.g. daylight) from an object elsewhere in a room.

In embodiments, the first field of view may take the form of a beam defined by an opening angle of the first light sensor; and the second field of view may take the form of a second beam directed parallel to the first beam and defined by a narrower opening angle of the second light sensor, contained within the opening angle of the first light sensor.

In particular example embodiments the second opening angle may be ≤5 degrees and the first opening angle may be ≥50 degrees (but other combinations of angles are also possible). The first and second light sensors may be co-located with one another.

In embodiments, the first field of view may take the form of a beam perpendicular to the illuminated surface and the second field of view may take the form of a beam perpendicular to the illuminated surface.

The first light sensor, second light sensor and the electric lighting device may be mounted above the illuminated surface, wherein the first and second light sensors may be directed vertically downwards and the illuminated surface may be a lower, horizontal surface. The first and second sensors may be co-located with the electric lighting device.

In one particularly advantageous application of the present invention, the information from the sensors is used to distinguish between an apparent change in light level due to reflection, and an actual change in light level due to a change in the amount of natural light entering the space in question. For instance, in certain situations, there may be no substantial change to the amount of natural light entering a space and no substantial change in the output of the electric lighting device. However, if there is a change in reflection within the space, more light may be reflected into the first light sensor. In a conventional arrangement without a second, narrower light sensor this might trick the system into wrongly adjusting the light level even though the total quantity of light in the space has not changed.

In embodiments of the present invention on the other hand, if there is an increase or decrease in reflection, both light from the electric lighting device and other light such as natural daylight light will be reflected into the first sensor, but there will be no corresponding change in the level sensed by the second sensor with the narrower field of view. Hence if there is a change in the level sensed by the first sensor but no substantial corresponding change in the level sensed by the second sensor, there is no real change to the overall amount of light in the space and no adjustment should be made.

Conversely, if there is an actual increase or decrease in natural light (e.g. more daylight entering through the window), this will flood the room with light from a range of angles and will result in an increase or decrease in the amount of light sensed by both sensors. So if there is a change in the level sensed by the first sensor and a corresponding change in the level sensed by the second sensor, an adjustment should be made to compensate for the overall change caused by the natural light.

Therefore in embodiments of the present invention, the signal level detector may be configured to adjust the illumination level in the environment based on the information distinguishing between the first and second signals. In embodiments the first and second signals may each comprise a contribution from an electric lighting device (102) reflected from said surface and additional light reflected from said surface; and the signal level detector may be configured to adjust the illumination level based on said information to compensate for a change in the additional light.

The condition prevents the signal level detector from adjusting the level of light on one or more occasions when a variation in the input signal occurs due to glare, rather than due to an actual change in the level of light (e.g. due to more daylight entering the space). If it appears based on the first sensor alone that the light level has changed but there is no corresponding change in the level sensed by the second sensor, the signal level detector refrains from adjusting the light level.

In further embodiments, the signal level detector may be configured to adjust the illumination level in the environment based on said information to compensate for a change in the additional light.

The signal level detector may be configured to adjust the illumination level on condition that, when a change in the first signal (indicative of the light level detected by the first sensor) is identified, a corresponding change is identified in the second signal (indicative of the light level detected by the second sensor).

The signal level detector may be configured to control the illumination level by one or both of: controlling an output level of the electric lighting device; and controlling one or more other devices for controlling an amount of light admitted or directed into said environment.

The signal level detector may be configured to identify one or both of the changes in the first and second signals (indicative of the light levels detected by the first and second light sensors respectively) on condition of varying beyond a respective threshold amount.

According to another aspect of the present invention, there may be provided a luminaire having the apparatus comprising the first and second light sensors integrated within a housing of the luminaire.

According to another aspect of the present invention, there is provided a method comprising: using a first light sensor having a first field of view to detect light reflected from an illuminated surface falling within the first field of view; and using a second light sensor having a second, narrower field of view to detect light falling within the second field of view; wherein the second field of view is concentrated on a region on said surface so as to exclude glare from objects outside said region, whereas the first field of view extends beyond said region.

In embodiments, the method may further comprise operations in accordance with any of the above apparatus features.

According to another aspect of the present invention, there may be provided a computer program product embodied on a computer-readable storage medium and comprising code configured so as when executed on a processing apparatus of a lighting system to perform operations in accordance with any of the above apparatus or method features.

According to another aspect, the operations performed by the present invention may be implemented wholly or partially in dedicated hardware circuitry.

BRIEF DESCRIPTION OF THE DRAWINGS

For a better understanding of the present invention and to show how it may be put into effect, reference is made by way of example to the accompanying drawings in which.

DESCRIPTION OF PREFERRED EMBODIMENTS

Figure 1:
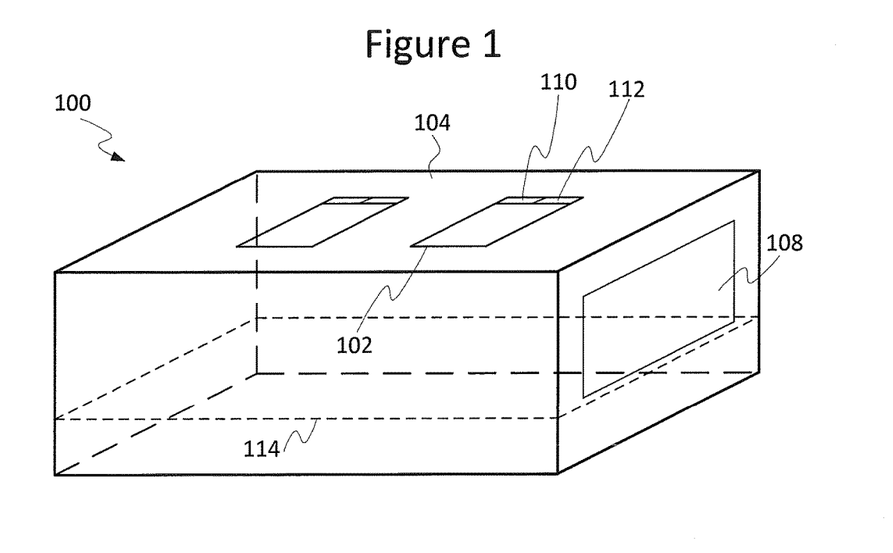
FIG. 1 is a schematic illustration of a lighting system installed in a room of a building.

FIG. 1 is a schematic representation of an environment such as an interior space of a building, e.g. an office or other room 100, installed with an example lighting system according to one embodiment of the present invention. The lighting system comprises one or more electric lighting devices 102 which may take the form of integrated fixtures of the room or free-standing units. Each lighting device 102 comprises an electric lighting element such as an LED (light emitting diode) or electric filament, along with any associated fixture or fitting (sometimes referred to as a luminaire). For example the electric lighting devices 102 may be mounted on a ceiling 104 of the room 100. Each electric lighting device 102 emits artificially generated light. The room 100 also comprises one or more openings such as a window 108, e.g. a window in a side wall of the room and/or a skylight. The window 108 admits other light into the room 100 from the exterior, principally natural light comprising daylight from the sun.

In the embodiment of FIG. 1, the lighting system further comprises a respective light sensor 110 and controller 112 for each of the electric lighting devices 102. The controller 112 is coupled to the respective lighting device 102, and the light sensor 110 is coupled to the controller 112. The light sensor 110 may also be substantially co-located with the respective lighting device 102. Each controller 112 controls the light of its respective lighting device 102 based on its respective sensor 110. The controller 112 may be calibrated to control the light emitted from the device to provide a specified target light level at a certain point or height within the room 100, such as desk height 114. I.e. the controller 112 is calibrated (e.g. by a technician at the time of installation) with the information that a certain sensed level at the detector 110 corresponds to the specified light level at the height 114 in question, so if it detects a decrease below the sensed level it will increase the light emitted by the device 102 until the sensed level is back within range, and vice versa. For example one recommendation for an office workspace is 500 Lux at desk height. In this arrangement each of the controllers 112 may operate independently of one another.

Figure 2:
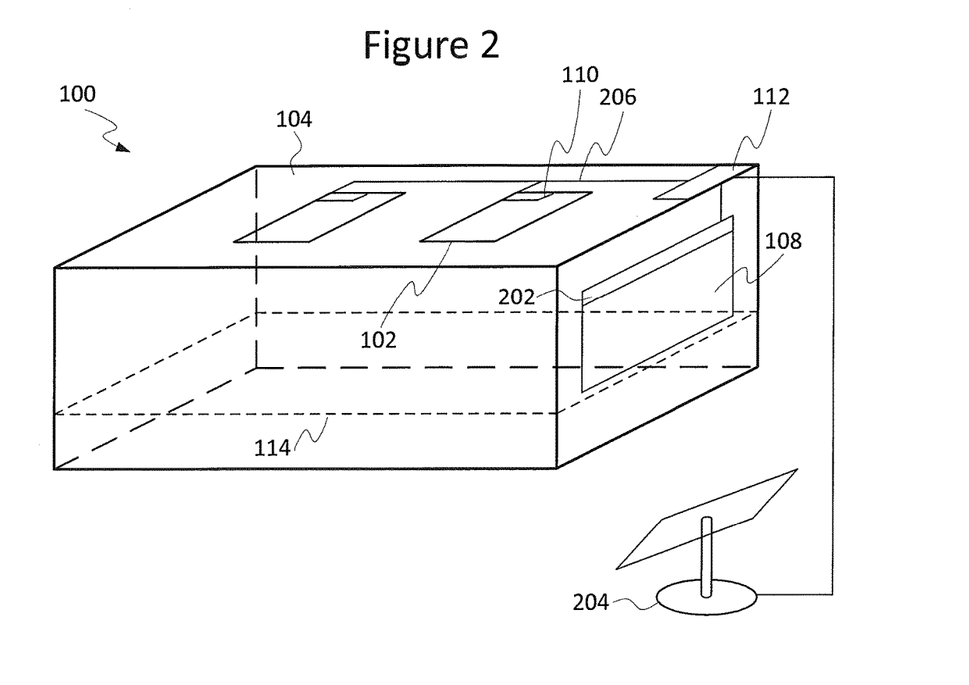
FIG. 2 is a schematic illustration of another lighting system installed in a room.

In an alternative arrangement shown in FIG. 2 the room 100 is installed with an integrated lighting system according to another embodiment of the present invention. Here a shared controller 112 is coupled to one or more lighting devices 102 (each col-located with a respective light sensor 110) and also to one or more alternative devices 202, 204 for controlling light level in the room 100. For example the one or more alternative devices may comprise a window treatment 202 for controlling the amount of natural light admitted in through the window 108 from the exterior, such as an automatic blind for covering a variable area of the window 108 or smart glass with controllable opacity. Alternatively or additionally, the one or more alternative devices may comprise a heliostat 204 with a movable reflector, operable to direct a controllable amount of natural light in through the window 108 from the exterior. The light sensors 110 and devices 102, 202, 204 are coupled to the controller via a suitable interconnect 206.

In such embodiments the controller 112 is still calibrated to target a specified light level at desk height 114 (or such like) but has one or more alternative devices available for varying the light level, other than controlling the amount of light output from the one or more lighting devices 102. For example if the light in the room 100 needs to be increased, the controller 112 may be configured to first attempt to achieve the target light level using one or more of the alternative devices 202 and/or 204, and then resort to increasing output of the lighting devices 102 the target level cannot be met that way. Alternatively the controller 112 may be configured with an algorithm for controlling the lighting devices and one or more alternative devices together in a synergistic manner, an example of which will be given later. Another option is that the controller 112 is cony coupled to the one or more alternative devices, and does not control the light emitted by the electric lighting devices 102 at all.

Figure 3:
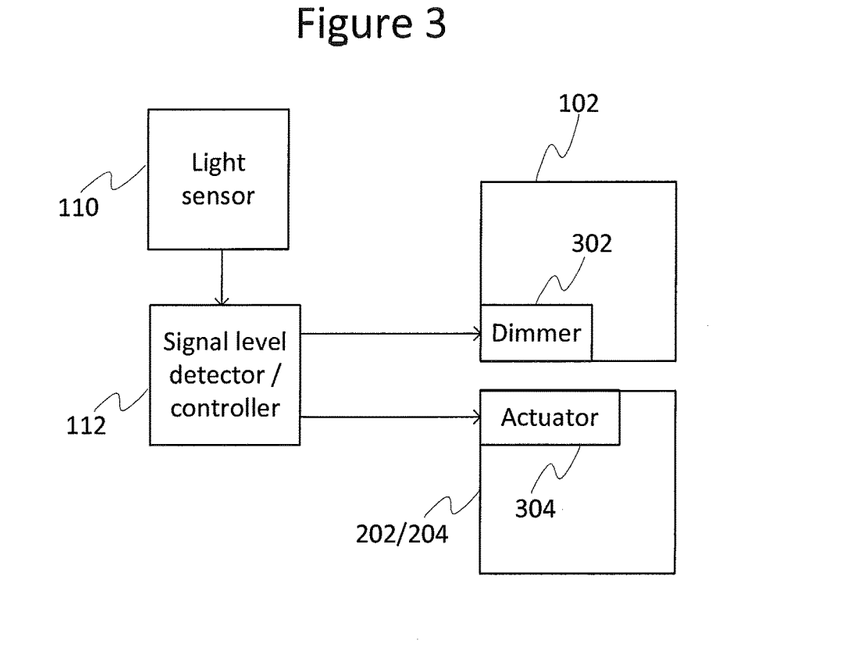
FIG. 3 is a schematic block diagram of a lighting system including a control system.

FIG. 3 is a schematic block diagram showing some of the components of FIGS. 1 and 2. The light sensor 110 is coupled to the controller 112 and arranged to supply it with an input signal that is representative of the level of light arriving at the light sensor 110. The controller 112 takes the form of a signal level detector configured to control the light based information derived from the input signal. The controller 112 is coupled to one or more of the electric lighting devices 102 and alternative devices 202, 204, and arranged to supply each of them with a respective control signal which controls the amount of light in the room 100 via a respective control element 302, 304 of the device. In the case of an electric lighting device 102, the control element comprises a dimmer 302 operable to increase and decrease the amount of artificial light emitted by that lighting device 102 in dependence on the respective control signal from the controller 112. In the case of one of the alternative devices 202, 204, the control element comprises an actuator 304 operable to increase and decrease the amount of natural light admitted or directed into the room 100 in dependence on the respective control signal from the controller 112. E.g. in an automatic window blind or heliostat the actuator 304 may comprises a motor for moving the blind or reflector, and in a smart glass system the actuator may comprise circuitry for controlling the opacity of the glass.

In embodiments any one, some or all of the devices 102, 202 and 204 may be present as part of the system. The controller 112 may be implemented in the form of software stored on a storage device and arranged for execution on a processor of the lighting system, or in the form of dedicated hardware circuitry, or a combination of these. In the case of a software implementation the storage device may comprise any suitable medium or media such as magnetic or electronic storage. The processor may comprise one or more processing cores or units.

In a basic system the controller would simply act based on the total sensed amount of light, calibrated to the target level at desk height 114 (or such like). However, rather than just detecting the total overall amount of light in the room 100, the following embodiments of the present invention distinguish between light from different sources based on the angle of its reflection Referring to FIG. 4, light reflections 404 "seen" by the photocell 110 may result in wrong light level settings. If the (sun)light is reflected by an object 402, then a light beam may fall within the sensor and so the measurement is disrupted. The measured light level is not in line with light level in the field of view of the sensor 110.

Figure 4:
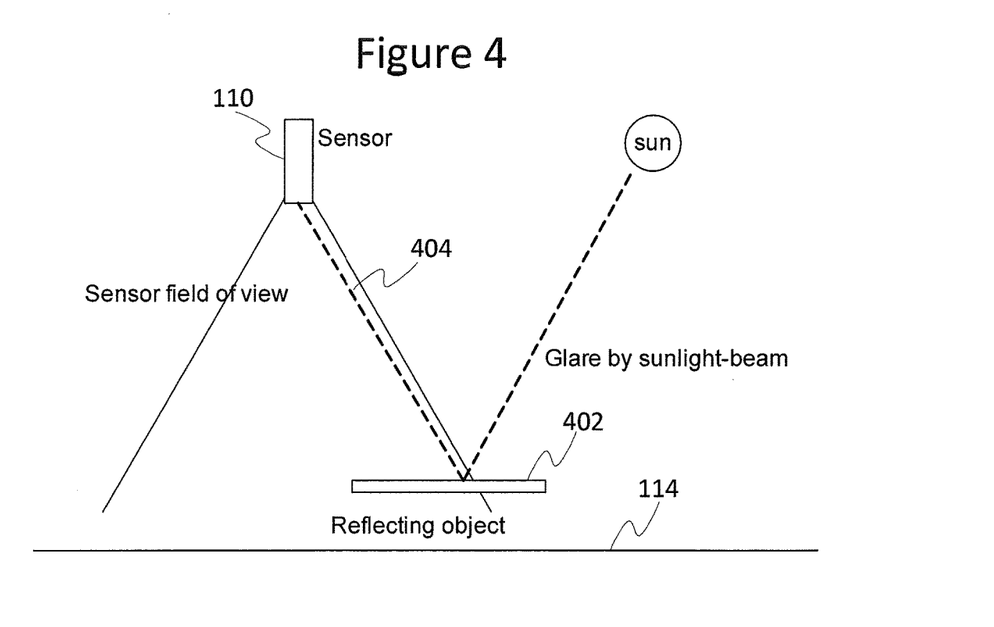
FIG. 4 is a schematic illustration of the field of view of a light sensor.

A related problem is that when relocating reflecting objects 402 such as paperwork on a desk 114, these may be rearranged in such a way that the light sensor 110 detects a change in light level which triggers an adjustment of light levels. However, this may not in fact be desired because the light level on the desk has not actually changed. For example consider a dark desk which reflects little light. If this is then covered with white paperwork the paper will locally reflect light, which in turn may cause an undesired reduction of light output of the lighting device 102.

Figure 5:
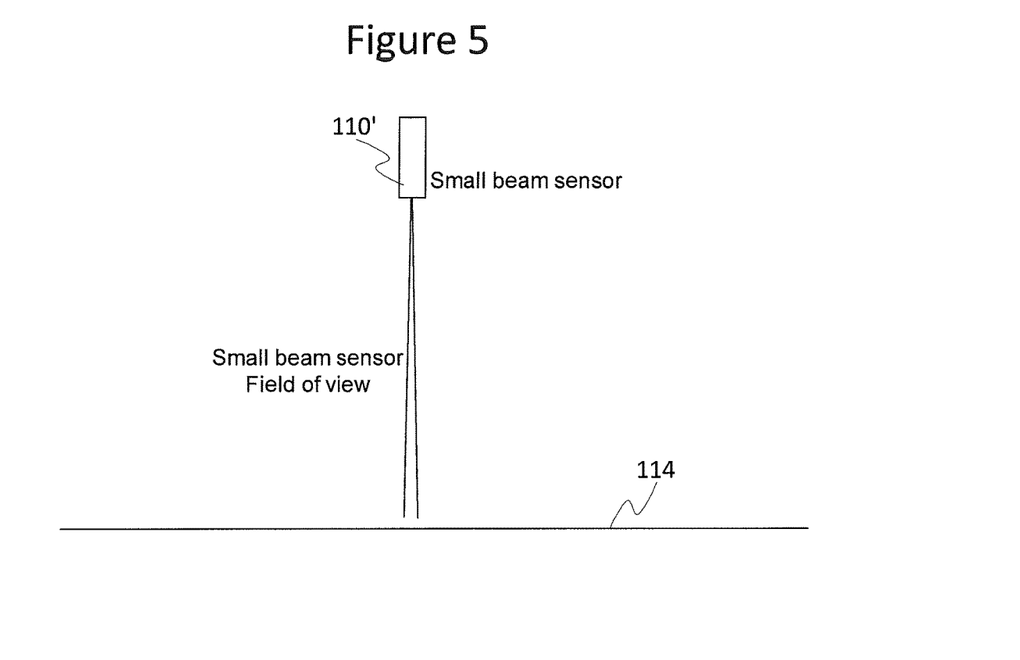
FIG. 5 is another schematic illustration of the field of view of a light sensor.

To address this, the sensing apparatus is equipped with a second photocell element with a very small field of view. FIG. 5 illustrates a second light sensor element 110' with a very small viewing angle, to be placed nearby the first sensor element 110.

Figure 6:
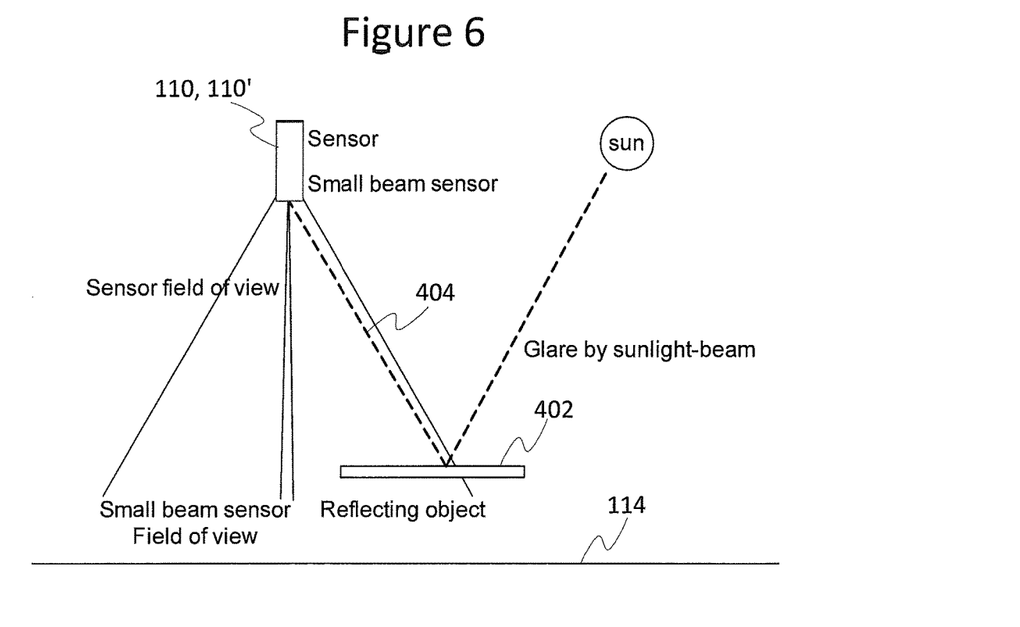
FIG. 6 is a schematic illustration of the field of view of an arrangement of light sensors.

FIG. 6 illustrates the second light sensor 110' in situ with the first sensor 110. The second sensor is also coupled to the controller 112 in a similar manner as described in relation to the first sensor 110 in FIG. 3. The two sensors 110, 110' are directed in the same direction and the second, narrower field of view (of the second sensor 110') falls entirely within the first, broader field of view (of the first sensor 110).

In embodiments, the light sensors 110, 110' are located together along with the lighting device 102 directed towards the surface 114 being illuminated by the lighting device 102, e.g. mounted together above the surface 114 such as on the ceiling 104 (which could mean either integrated in the ceiling, attached to the ceiling or hanging from the ceiling). The respective field of view of each sensor 110, 110' may take the form of a beam, i.e. in that the sensor captures a certain beam of light reflected form the surface 114. The first sensor 110 is configured to capture a wider beam and the second sensor 110' is configured to capture a narrower beam. To obtain the overlapping fields of view, the sensors 110, 110' may be located together and directed with the two beams directed substantially in the same direction as one another (their axes are substantially parallel). The sensors 110, 110' may be directed with the beam substantially perpendicular to the illuminated surface 114. Hence the sensors can be used to detect the amount of light on the surface 114. Typically in the case of a room 100 the ceiling 102 and surface 114 (e.g. desk, table or worktop) are parallel to one another in the horizontal plane; and the beams are substantially vertical, being directed downwards towards the desk 114 or the like.

When daylight level changes over time, both sensors 110, 110' will detect changes that correlate to each other, and therefore they are correct measurements. However, a light beam from a reflecting object 402 (glare) will not be seen by the second sensing element 110' with the smaller field of view. Therefore when the correlation is not present, one sensor detects changes not see by the other. In this case it is highly unlikely that any variations in the sensed levels were caused by changes in daylight level, and can therefore be disregarded or taken into account but at reduced levels.

Light beams from reflecting objects are seen by the first, wide-viewed sensor element 110 but not by the second, narrow-viewed sensing element 110'. When only the wide-viewed element 110 sees big changes this means the changes are caused by a reflecting beam and so those measurements can be neglected. When a change in light level is sensed at both sensors 110, 110' on the other hand, the light level may be adapted.

Figure 7:
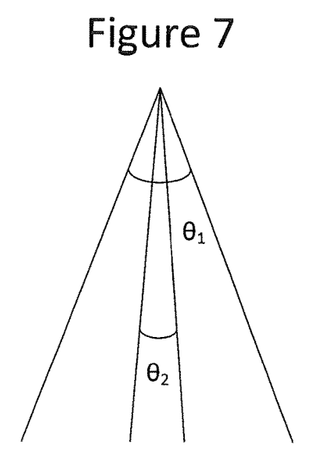
FIG. 7 is a schematic illustration of an arrangement of viewing angles for sensing light.
Figure 8:
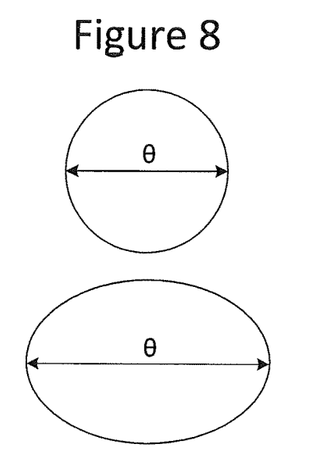
FIG. 8 is another schematic illustration of viewing angles for sensing light.

Referring to FIGS. 7 and 8, in embodiments the different fields of view of the two sensors 110, 110' take the form of a beam, with two different beam angles for the two different detection beams. This may be achieved by configuring the sensors 110, 110' with different opening angles such that the opening angle is the beam angle.

As shown in FIG. 7, here the beam angle or opening angle $\theta$ refers to the total angle across the detected beam in a plane parallel to the axis of the beam (rather than the angle from the axis of the beam which is half this). If the beam is symmetrical about its axis, the beam may also be described as a detection cone. Referring to the upper example FIG. 8, this means a circular beam pattern in the plane perpendicular to the axis of the beam (corresponding to a circle on the surface from which light is being detected if the beam is directed perpendicular to that surface). However, referring to the lower example in FIG. 8, other beam patterns are also possible, in which case the beam angle or opening angle may refer to a characteristic angle such as the widest angle. Either or both beams could have any such pattern.

Referring again to FIG. 7, the two beams are directed in the same direction, so that the second beam angle falls entirely within the first beam angle. The first sensor 110 has a first, wider opening angle $\theta_1$ that detects both the light on the desk and the glare 404 from the reflecting object 402. The second sensor 110' has a second, narrower opening angle $\theta_2$ that is concentrated directly on the spot on the desk 114 (or other such surface) towards which the lighting device 102 is directed, and so collects only (or predominantly) light on the desk and avoids collecting any of the glare 404.

The second, narrower angle is a small acute angle. The first, wider angle is an acute or obtuse angle (<180 degrees) but not a reflect angle. In a preferred embodiment the second opening angle $\theta_2$ is no more than 5 degrees across (2.5 degrees from the axis of the beam, e.g. from the vertical for a vertical beam); and the first opening angle $\theta_1$ is no less than 50 degrees across (25 degrees from the axis of the beam). The second angle $\theta_2$ may be between 1 and 2 degrees, and the first angle $\theta_1$ may be 70 degrees or more.

Figure 9:
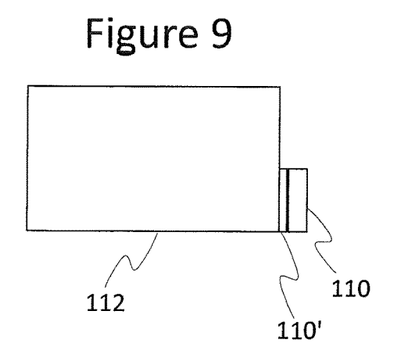
FIG. 9 is a schematic illustration of lighting system.
Figure 10:
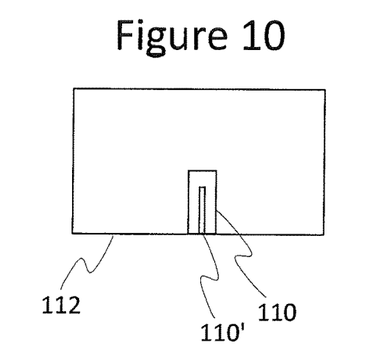
FIG. 10 is another schematic illustration of a lighting system.

In embodiments the sensors 110, 110' are co-located with the lighting device 102 so as when directed downwards to sense light reflected back up from the desk 114 (or other surface). FIGS. 9 and 10 schematically illustrate two example arrangements for this. In FIG. 9 the sensors 110, 110' are substantially side-by-side with one another, and side-by-side with the lighting device 102. In FIG. 10, the second, narrower sensor 110' is located within the field of view of the wider first sensor 110, which may be an option if the second sensor is small enough not to substantially obstruct the view of first sensor. Similarly the first and/or second sensor may be located within the field of the lighting device 102, e.g. in the same housing. This may be an option of the sensors are small enough not to substantially obstruct the light output of the device 102.

Figure 11:
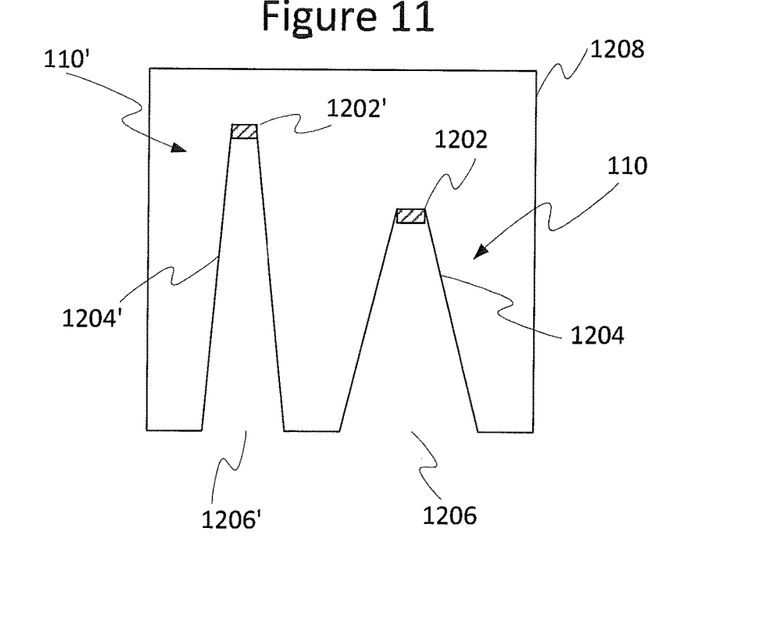
FIG. 11 is a schematic illustration of a light sensing unit.

FIG. 11 shows an example apparatus within which the sensors 110 or 110' may be arranged to provide the desired fields of view. The apparatus preferably takes the form of a unit comprising a housing (i.e. casing) 1208 and the two light sensors 110, 110' arranged within this same housing 1208, e.g. side-by-side with one another.

The first light sensor 110 comprises a first photocell element 1202 embedded within the apparatus. The first opening angle $\theta_1$ is provided by one or more first sidewalls 1204 around the first photocell element 1202 (e.g. a circular sidewall) which block light from the exterior of the apparatus, and a first opening 1206 in the apparatus which exposes the first photocell element 1202 to light from the exterior. Thus only light from within certain range of incident angles can enter the apparatus through the opening 1206, other light being blocked by the surrounding sidewall 1204. Similarly the second light sensor 110' comprises a second photocell element 1202' embedded within the apparatus, with the second opening angle $\theta_2$ being provided by a second sidewall 1204' around the second photocell element 1202' to block light from the exterior of the apparatus and a second opening 1206' in the apparatus which exposes the second photocell element 1202' to light from the exterior within the respective range of angles. In embodiments the sidewalls 1204 and 1204' for each of the respective sensors 110 and 110' may be funnel shaped. However, straight or other shaped sidewalls can also provide the desired effect. Other options for defining an opening angle are also possible, e.g. using a lens to direct light towards the respective element 1202 and/or 1202'.

An example method that may be implemented in the controller 112 is now discussed with reference to the flow chart FIG. 12.

At step S10 the controller 112 monitors the signal from the first sensor 110 for changes in the sensed amount of light. As the opening angle of the first sensor 110 provides a wider field of view, this represents an overall amount of light on the desk 114 comprising contributions both from the lighting device 102 and from natural light (typically daylight), both reflected from the desk and elsewhere. When a change is identified the method progresses to step S20.

Note that in embodiments, the controller 112 may be configured to apply a threshold interval to this monitoring in order to prevent being triggered in response to negligible fluctuations. So the controller 112 proceeds to step S20 on condition that the reading from the second sensor does vary (either increases or decreases) beyond the threshold amount, i.e. outside of the threshold interval.

At step S20, the controller 112 uses the signal from the second light sensor 110' to check whether there has been a change in the amount of light sensed by the second sensor corresponding to the amount sensed by the first sensor 110. If the change found at step S10 was only due to glare 404 from a reflecting object 402, then the glare will tend to come from one specific, shallow angle and so no corresponding change will be seen in the reading from the second sensor 110'. In this case, the controller 112 refrains from making any adjustment to the light level in the room. On the other hand, if the change found at step S10 was due to an increase in the overall amount of light in the room 100, e.g. because more daylight is entering through the window 108, then the light tends to be reflected from the desk 114 (or the like) at many different angles and so there will be seen a corresponding change in the reading from the second sensor 110. The controller 112 is configured to identify when this occurs and in response to adjust the amount of light in the room 100 accordingly, e.g. by adjusting the output for the lighting device 102 and/or adjusting one of the alternative devices such as window treatment 202 or heliostat 204.

The "corresponding" change is a measure of an amount by which the reading from the second sensor 110' will change for a given change in the reading from the first sensor 110 when caused by a change in the overall amount of light in the room (rather than when caused by any change in glare). In embodiments the corresponding change may be determined on the basis that the ratio of change will be the same for both sensors when the daylight changes. In further embodiments what constitutes a corresponding change may be determined empirically at a calibration stage, e.g. upon installation in the room 100; or may be determined analytically based on knowledge of the angles $\theta_1$ and $\theta_2$, as well as any other factors such as the beam profiles of the two detection beams and a reflection coefficient of the desk.

In embodiments the corresponding change required to trigger an adjustment by the controller 112 may be treated as a threshold on the reading from the second sensor 110' (which threshold will generally be a function of the reading of from the first sensor 110). I.e. so the controller 112 is configured to identify a corresponding change in the reading from the second sensor on condition that it varies beyond the relevant threshold.

Figure 12:
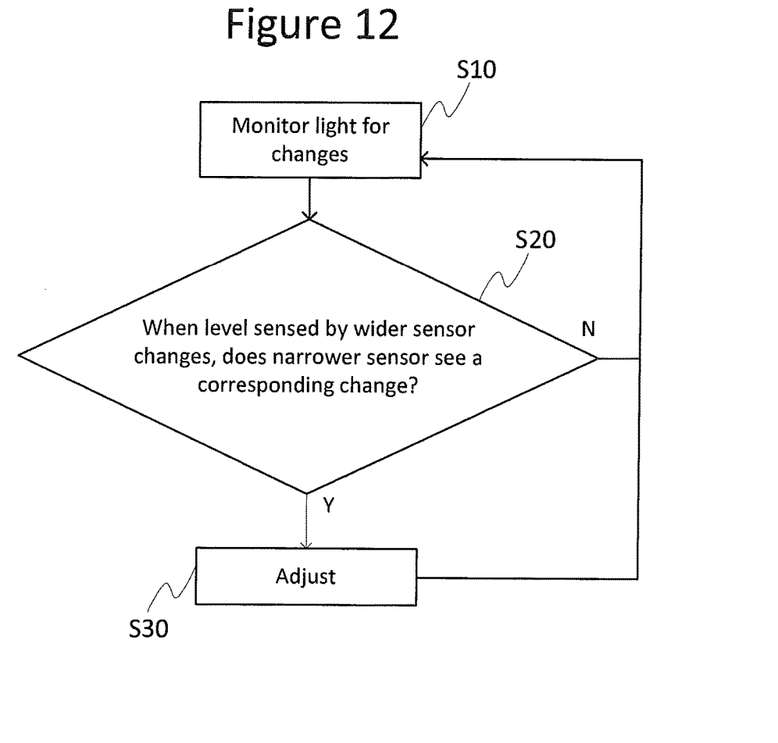
FIG. 12 is a flow chart of a lighting control method.

When the controller 112 determines that a real change in the amount of natural light has occurred (as opposed to an apparent change due to reflection), it proceeds to instigate an adjustment as represented by step S30 in FIG. 12.

In some embodiments it may be determined on a yes/no basis whether the change was substantially due to glare. An adjustment is then made based on the reading from the first sensor 110 on condition that the sensed change was not due to glare, otherwise no adjustment may be made.

In alternative embodiments, it may be determined that the sensed change was influenced in part by glare but not entirely due to glare—i.e. there is both a contribution from glare and a contribution due to a change in natural light. In this case the controller 112 may be configured to base the adjustment on either the first sensor 110 or the second sensor 110' in dependence on whether it was determined that the sensed change was influenced by glare. When it is determined that the first, broader sensor 110 is not substantially influenced by glare then the adjustment is based on the signal from the first sensor 110; but when the first sensor 110 is found to be substantially influenced by glare, the input from the small beam sensor 110' can be used to adjust the light level instead. Using a small beam sensor for light adjustment is less accurate but it is better than reacting to the glare influencing the first sensor 110.

In embodiments the controller 112 makes the adjustment by changing the light output set-point of one or more of the lighting devices 102 (via the output signal which it supplies to the light level control element 202). For example in the arrangement of FIG. 1 each controller is responsible for controlling its own respective lighting device.

One way of adjusting the light level is to make a change $\Delta L$ to the light output L of the lighting device 102. If the change is purely (or at least mainly) due to a change in natural light entering the room, the adjustment can be approximated as:

$$\Delta L = -C \cdot \Delta S$$

where $\Delta S$ is the difference between the level sensed by the relevant sensor 110 or 110' and the target for the sensed level, and C is a calibration factor, the calibration being determined empirically by a technician with a light meter at the installation stage. For example C may be described as $1/(p \cdot k)$ where p is the return path parameter (characterising reflection of light from the desk 114 to the sensor 110/110') and k is the output path parameter (characterising the path from lighting device 102 to desk 114).

Other relationships between L and S are also possible and may be tuned empirically. Alternatively the controller 112 may adjust the light output of the device 102 in small steps in the relevant direction until the sensed level from the relevant sensor 110 or 110' falls back within a threshold range of the target for the sensed level.

Referring to the arrangement of FIG. 2, in further embodiments the controller 112 may instead make the adjustment by adjusting an alternative device such as the window treatment 202, e.g. varying the treatment until the level sensed by the relevant sensor 110 or 110' returns to a level within a threshold range of the target for the sensed level. In one such embodiment, the controller 112 may be configured to first attempt to compensate for the change in light level using the window treatment 202 (or the like), e.g. to admit more light if the amount of natural light in the room has decreased, and then resort to adjusting the light output of the electric lighting device(s) 102 only if the difference cannot be made up using the window treatment 202 (or other alternative device such as heliostat 204).

Alternatively, the controller 112 may be configured to control both the electric lighting 102 and an alternative device such as window treatment 202 together. One scheme is to operate both window treatments and electric lights in such a way that both of them attempt to reduce the lighting error and energy consumption in the space. E.g. such an objective may lead to the following equations:

$$L(n) = L(n-1) - \mu_1 \frac{\partial \|e(n)\|^2}{\partial L} - \mu_2 \frac{\partial \|E(n)\|^2}{\partial L}, \text{ and}$$

$$W(n) = W(n-1) - \mu_3 \frac{\partial \|e(n)\|^2}{\partial L} - \mu_4 \frac{\partial \|E(n)\|^2}{\partial L}$$

where L and W are the variables being adapted, representing light output and window treatment respectively. For example the window treatment may be measured in terms of how much of the window 108 is exposed by an automatic blind. The variable e is the lighting error, i.e. the difference between user set point and measured light level, E is proportional to energy consumption, and the factors $\mu$ are small positive constants (adaptation step sizes). The last two terms are the amount by which the electric lights and window treatment will be adjusted for each adaptive control cycle. Here, n is an index of the cycle. The equations may be solved iteratively or analytically.

The above are just examples, and once it is determined at step S20 that an adjustment needs to be made then any suitable control algorithm may be applied. Whatever way the adjustment is made, the controller 112 subsequently continues to monitor the input signal for further changes, illustrated by a return to step S10 in FIG. 12.

While the invention has been illustrated and described in detail in the drawings and foregoing description, such illustration and description are to be considered illustrative or exemplary and not restrictive; the invention is not limited to the disclosed embodiments.

For example, the above has been described in terms of an example room 100, but the invention may be applied in any environment that receives light from both electric lighting and one or more other sources, e.g. any covered structure such as a gazebo, tunnel or vehicle interior, or even an illuminated open air space e.g. at night time. Further, the term window need not only refer to windows on walls, but also for example to skylights. Also the height, region or point relative to which the target light level is set need not be limited to desk height.

The invention could be sold as an individual sensor unit comprising the two sensors 110 and 110' in the same housing, or as a complete lighting system, or any combination of components described above. In an alternative application the invention could be implemented as a stand-alone sensing system. For example this could be used to give a reading for use by a designer of a lighting system, or a technician calibrating a lighting system, or a surveyor of a building or other environment.

The above has been described in terms of two sensors co-located with the respective lighting device 102, and being directed downwards towards the illuminated surface 114 with detection parallel detection beams perpendicular to that surface. However, other arrangements may be possible—so long as the field of view of one of the sensors is narrower than that of the other sensor and falls within the field of view of that other sensor, then if suitably directed it will be possible to distinguish between light from a specific target or region and other light from other directions.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for sensing an illumination level in an environment, the apparatus comprising:
    an input for receiving signals from at least two light sensors; and
    a signal level detector configured to receive a first signal indicative of light reflected from an illuminated surface into a first of said light sensors having a first field of view, and to receive a second signal indicative of light reflected from the illuminated surface into a second of said light sensors having a second, narrower field of view concentrated on a region on said surface, the first field of view extending beyond said region;
    wherein the signal level detector is configured to determine information distinguishing between the first and second signals, and thereby distinguishing between a change in the illumination level and an effect of glare from objects outside said region, wherein the first and second signals each comprise a contribution from an electric lighting device reflected from said surface and additional light reflected from said surface; and the signal level detector is configured to adjust the illumination level based on said information to compensate for a change in the additional light, on condition that, when a change in the first signal is identified, a corresponding change is identified in the second signal.

2. The apparatus of claim 1, wherein the signal level detector is configured to identify one or both of the changes in the first and second signals on condition of varying beyond a respective threshold amount.

3. The apparatus of claim 2, wherein the signal level detector is configured to adjust the illumination level by one or both of:
    controlling an output level of the electric lighting device; and
    controlling one or more other devices for controlling an amount of light admitted or directed into the environment.

4. A lighting system comprising the apparatus of claim 1 and said first and second light sensors installed with said first and second fields of view respectively.

5. The lighting system of claim 4, wherein the first field of view takes the form of a beam defined by an opening angle of the first light sensor; and the second field of view takes the form of a second beam directed parallel to the first beam and defined by a narrower opening angle of the second light sensor.

6. The lighting system of claim 5, wherein the second opening angle is ≤5 degrees and the first opening angle is ≥50 degrees.

7. The lighting system of claim 4, wherein the first and second light sensors are co-located with one another.

8. The lighting system of claim 4, wherein the first field of view takes the form of a beam perpendicular to the illuminated surface and the second field of view takes the form of a beam perpendicular to the illuminated surface.

9. The lighting system of claim 4, wherein the first light sensor, second light sensor and the electric lighting device are mounted above the illuminated surface, the first and second light sensors being directed vertically downwards and the illuminated surface being a lower, horizontal surface.

10. The lighting system of claim 9, wherein the first and second sensors are co-located with the electric lighting device.

11. The lighting system of claim 4, wherein the additional light comprises natural light.

12. A method comprising:
    using a first light sensor having a first field of view to detect light reflected from an illuminated surface falling within the first field of view; and
    using a second light sensor having a second, narrower field of view to detect light falling within the second field of view;
    wherein the second field of view is concentrated on a region on said surface so as to exclude glare from objects outside said region, whereas the first field of view extends beyond said region;
    adjusting an illumination level on condition that, when a change in the first signal is identified, a corresponding change is identified in the second signal.

* * * * *